(12) United States Patent
Kuo et al.

(10) Patent No.: US 10,761,661 B2
(45) Date of Patent: Sep. 1, 2020

(54) CAPACITIVE TOUCH SYSTEM AND SENSING METHOD THEREOF

(71) Applicant: Silicon Integrated Systems Corp, Hsinchu (TW)

(72) Inventors: Chin-Hua Kuo, Hsinchu City (TW); Hsin-Hsuan Yu, Hsinchu City (TW); Jiun-Ying Yeh, Hsinchu City (TW); Ying-Jyh Yeh, Hsinchu City (TW)

(73) Assignee: SILICON INTEGRATED SYSTEMS CORP., Hsinchu (TW)

( * ) Notice: Subject to any disclaimer, the term of this patent is extended or adjusted under 35 U.S.C. 154(b) by 34 days.

(21) Appl. No.: 16/037,433

(22) Filed: Jul. 17, 2018

(65) Prior Publication Data

US 2019/0018520 A1   Jan. 17, 2019

(30) Foreign Application Priority Data

Jul. 17, 2017  (TW) .............................. 106123861 A (51) Int. Cl.
  *G06F 3/044*  (2006.01)
  *G06F 3/041*  (2006.01)
  *G06F 3/0354*  (2013.01)

(52) U.S. Cl.
  CPC .......... *G06F 3/044* (2013.01); *G06F 3/03545* (2013.01); *G06F 3/0414* (2013.01); *G06F 3/0416* (2013.01)

(58) Field of Classification Search
  CPC .... G06F 3/0416; G06F 3/044; G06F 3/03545; G06F 3/0414
  See application file for complete search history.

(56) References Cited

U.S. PATENT DOCUMENTS

| | | | |
|---|---|---|---|
| 2016/0139730 A1* | 5/2016 | Kida ..................... | G06F 3/0416 345/174 |
| 2016/0378208 A1* | 12/2016 | Shahparnia ......... | G06F 3/03545 345/173 |
| 2017/0031465 A1* | 2/2017 | Jung ..................... | G06F 3/0383 |
| 2017/0075434 A1* | 3/2017 | Lee ........................... | G06F 1/16 |
| 2018/0129311 A1* | 5/2018 | Westhues .............. | G06F 3/0442 |
| 2018/0299976 A1* | 10/2018 | Chiewcharnpipat .... | G06F 3/038 |

* cited by examiner

*Primary Examiner* — Abbas I Abdulselam (74) *Attorney, Agent, or Firm* — Muncy, Geissler, Olds & Lowe, P.C.

(57) ABSTRACT

A capacitive touch system and a sensing method thereof are disclosed. The capacitive touch system includes a touch panel; a touch control chip; and an active pen which includes a receiving part, a transmitting part, a control unit, and a pressure sensing element. The control unit controls the transmitting unit to output a pen driving signal according to a pen sensing signal. The pressure sensing element detects a pen pressure signal. The control unit outputs a voltage signal in responsive to the pen pressure signal after a time delay period. In the capacitive touch system and the sensing method thereof, the active pan is not required to be paired with the touch panel.

10 Claims, 7 Drawing Sheets

CAPACITIVE TOUCH SYSTEM AND SENSING METHOD THEREOF

TECHNICAL FIELD OF THE DISCLOSURE

The present disclosure relates to touch control technologies, and more particularly to a capacitive touch display system and a sensing method thereof.

BACKGROUND OF THE DISCLOSURE

Peripheral products have gradually developed alongside development of touch panels. One type of the peripheral products is an active pen (active stylus). Existing active pens have a pressure sensing function. Pressure sensing values sensed by the active pens are transmitted to touch panels via BLUETOOTH or other wireless communications standards. However, before the pressure sensing values sensed by the active pens are transmitted to the touch panels, the active pens need to be paired with the touch panels. As such, it is not convenient to use the active pens.

Therefore, there is a need to solve the above-mentioned problem in the prior art.

SUMMARY OF THE DISCLOSURE

An objective of the present disclosure is to provide a capacitive touch display system and a sensing method thereof capable of solving the problem in the prior art.

The capacitive touch system of the present disclosure includes a touch panel; a touch control chip configured to output a panel driving signal to the touch panel periodically; and an active pen including a receiving part, a transmitting part, a control unit, and a pressure sensing element. The receiving part senses the panel driving signal and generates a pen sensing signal. The control unit controls the transmitting part to output a pen driving signal according to the pen sensing signal. The touch control chip detects a position of a touch of the active pen according to the pen driving signal. The pressure sensing element detects a pen pressure signal according to the touch and transmits the pen pressure signal to the control unit. The control unit outputs, in response to the pen pressure signal, a voltage signal after a time delay period. The voltage signal is transmitted to the touch control chip via the transmitting part and the touch panel.

In the sensing method of the capacitive touch system of the present disclosure, the capacitive touch system includes a touch panel, a touch control chip, and an active pen. The active pen includes a receiving part, a transmitting part, a control unit, and a pressure sensing element. The sensing method of the capacitive touch system includes sensing a panel driving signal from the touch control chip and generating a pen sensing signal by the receiving part; controlling the transmitting part to output a pen driving signal according to the pen sensing signal by the control unit; detecting a position of a touch of the active pen according to the pen driving signal by the touch control chip; detecting a pen pressure signal according to the touch and transmitting the pen pressure signal to the control unit by the pressure sensing element; outputting, in response to the pen pressure signal, a voltage signal by the control unit after a time delay period; and transmitting the voltage signal to the touch control chip via the transmitting part and the touch panel.

In the capacitive touch system and the sensing method thereof, the active pen is not required to be linked to and paired with the touch panel. Furthermore, the active pen can transmit the pen driving signal (configured to detect the position of the touch) synchronously without the time delay period and transmit the voltage signal (configured to detect the pressure sensing value) asynchronously due to the time delay period.

DETAILED DESCRIPTION OF THE DISCLOSURE

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure, and as used herein, the term "embodiment" refers to an instance, an example, or an illustration but is not intended to limit the present disclosure. In addition, the articles "a" and "an" as used in the specification and the appended claims should generally be construed to mean "one or more" unless specified otherwise or clear from the context to be directed to a singular form. Also, in the appending drawings, the components having similar or the same structure or function are indicated by the same reference number.

Figure 1:
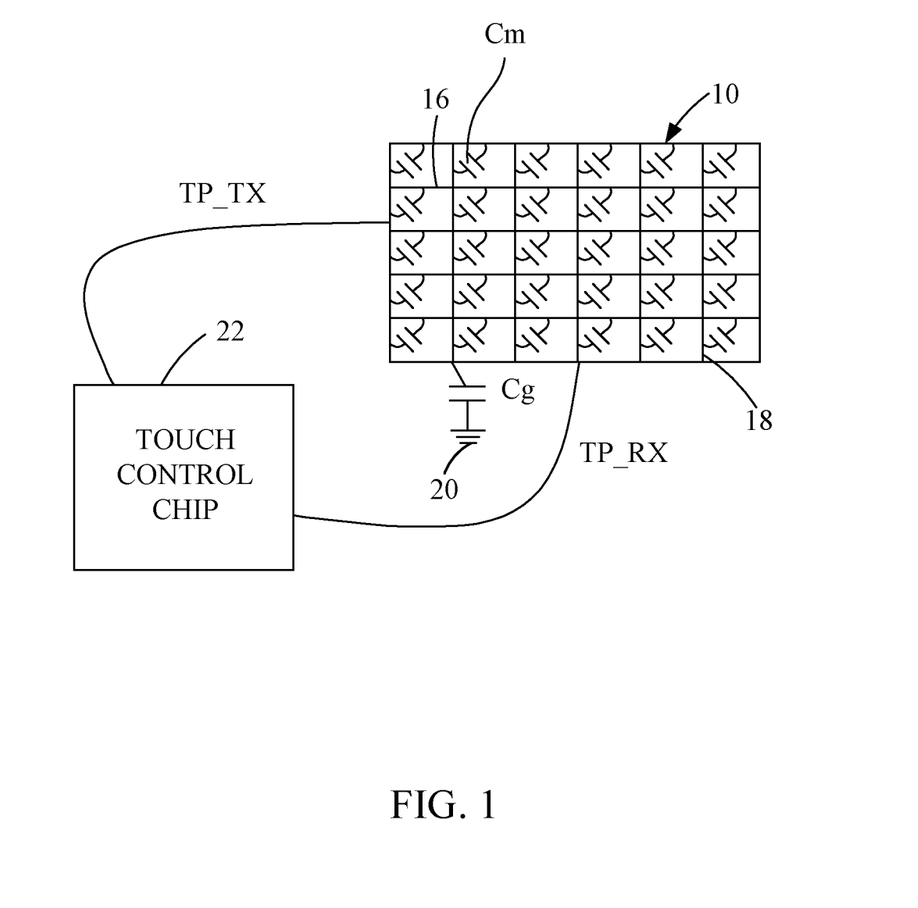
FIG. 1 illustrates a touch panel.

Please refer to FIG. 1. FIG. 1 illustrates a touch panel 10. The touch panel 10 may be a capacitive touch panel.

Figure 2:
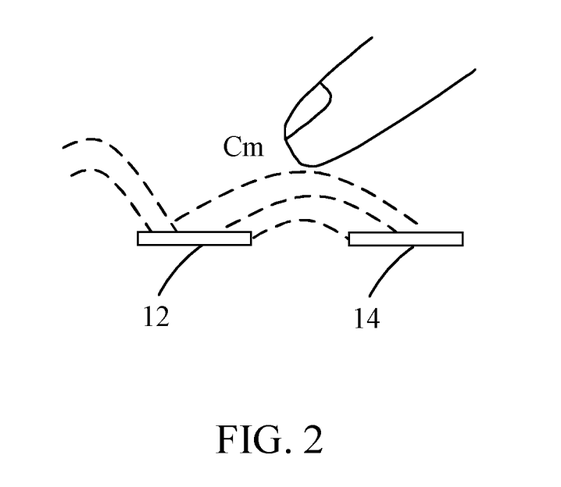
FIG. 2 illustrates that a coupling capacitance is formed between a driving electrode and a sensing electrode of the touch panel.

As shown in FIG. 1, the touch panel 10 generally includes a plurality of electrodes arranged in a matrix and a plurality of conductive wires connecting to the electrodes. These electrodes are made of indium tin oxide (ITO) and have a bar or diamond shape. In a mutual capacitance framework, these electrodes include a plurality of driving electrodes 12 (as shown in FIG. 2) and a plurality of sensing electrodes 14 (as shown in FIG. 2). Correspondingly, the conductive wires also include a plurality of driving wires 16 and a plurality of sensing wires 18. Each of the driving wires 16 connects to one of the driving electrodes 12. Each of the sensing wires 18 connects to one of the sensing electrodes 14. In a driving scheme of the mutual capacitance framework, a panel driving signal TP_TX (TP represents a Touch Panel) is sequentially applied to the driving electrodes 12 via the driving wires 16. The panel driving signal TP_TX is usually a pulse signal. Correspondingly, a sensing signal TP_RX is read from the sensing electrodes 14 via the sensing wires 18.

Figure 3:
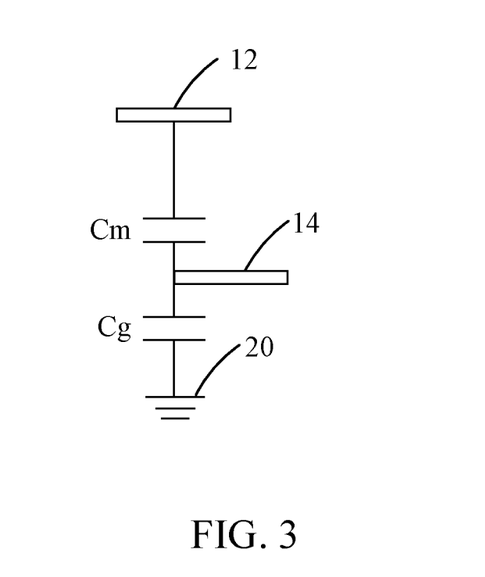
FIG. 3 illustrates that a relation between the coupling capacitance and a ground capacitance of the touch panel.

Please refer to FIG. 1 to FIG. 3. FIG. 2 illustrates that a coupling capacitance (mutual capacitance) Cm is formed between a driving electrode 12 and a sensing electrode 14 of the touch panel 10. FIG. 3 illustrates that a relation between the coupling capacitance Cm and a ground capacitance Cg of the touch panel 10.

As shown in FIG. 1 to FIG. 3, the coupling capacitance Cm is formed between the driving electrode 12 and the sensing electrode 14. As shown in FIG. 1 and FIG. 3, the ground capacitance Cg is formed between the sensing electrode 14 and a ground terminal 20. The coupling capacitance Cm is changed when a finger (or a similar item) approaches, thereby changing the sensing signal TP_RX measured by the sensing electrode 14.

Figure 4:
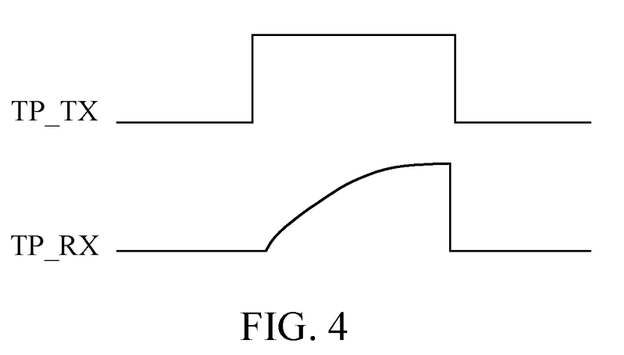
FIG. 4 illustrates that the panel driving signal and the sensing signal that are measured when no finger approaches.
Figure 5:
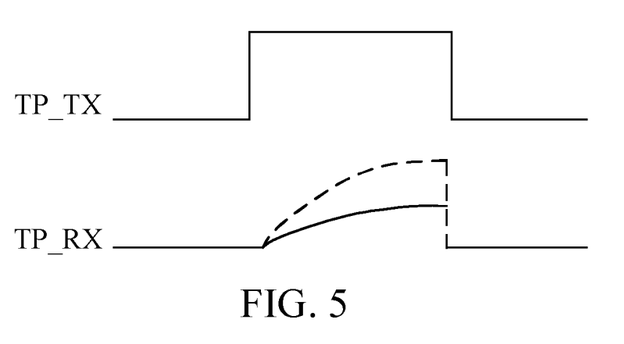
FIG. 5 illustrates that the panel driving signal and the sensing signal that are measured when a finger approaches.

Please refer to FIG. 1 to FIG. 5. FIG. 4 illustrates that the panel driving signal TP_TX and the sensing signal TP_RX that are measured when no finger approaches. FIG. 5 illustrates that the panel driving signal TP_TX and the sensing signal TP_RX that are measured when a finger approaches.

As shown in FIG. 4 and FIG. 5, when the finger approaches, the coupling capacitance Cm between the driving electrode 12 and the sensing electrode 14 in FIG. 2 is affected and thus decreases. Accordingly, the sensing signal TP_RX measured from the sensing electrode 14 via the sensing wire 18 decreases as well. A touch control chip 22 in FIG. 1 is configured to sequentially apply the panel driving signal TP_TX to each of the driving electrodes 12 of the touch panel 10 and sequentially read the sensing signal TP_RX from each of the sensing electrodes 14. In this way, the touch control chip 22 can resolve a position of a touch.

Figure 6:
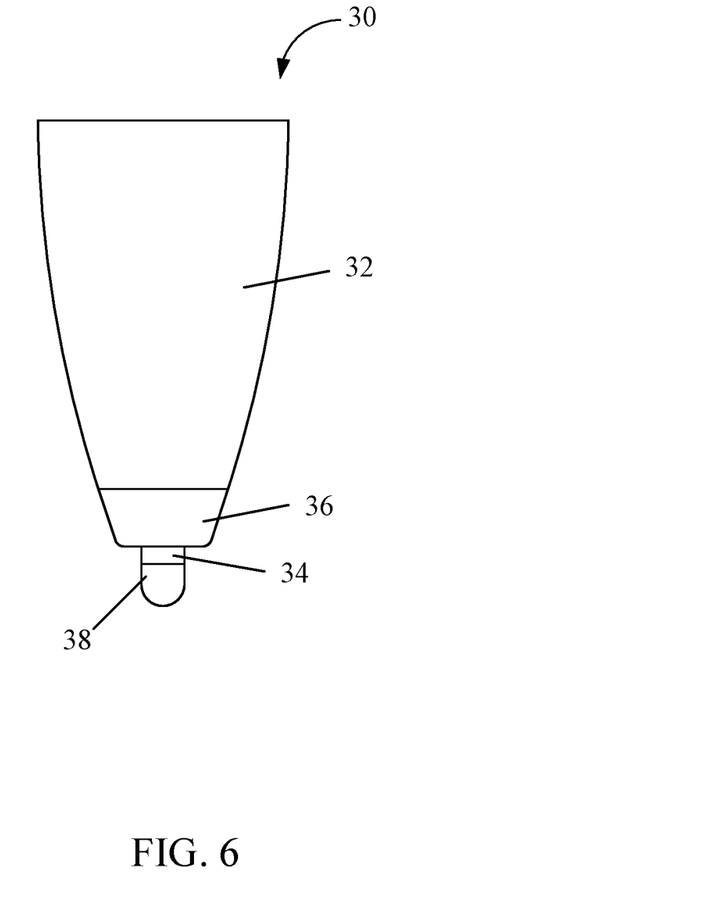
FIG. 6 illustrates an active pen.

Please refer to FIG. 6. FIG. 6 illustrates an active pen 30. The active pen 30 (also called an active stylus pen or a capacitive pen) can result in an effect on the touch panel 10 in FIG. 1, similar to the effect generated by touching the touch panel 10 in FIG. 1 using the finger. That is, the coupling capacitance Cm between the driving electrode 12 and the sensing electrode 14 in FIG. 2 can be changed. The active pen 30 includes an outer case 32, a receiving part 34, a transmitting part 36, and a pressure sensing element 38. The outer case 32 has a hollow structure. The receiving part 34 extends outwardly from one terminal of the outer case 32. The receiving part 34 is configured to receive the panel driving signal TP_TX in FIG. 1. The transmitting part 36 is disposed inside the terminal of the outer case 32 and configured to generate a pen driving signal according to the panel driving signal TP_TX. The pen driving signal is transmitted to the sensing electrode 14 in FIG. 2 via the pressure sensing element 38, thereby changing the coupling capacitance Cm between the driving electrode 12 and the sensing electrode 14 for the touch control chip 22 to detect.

Furthermore, when the pressure sensing element 38 touches the touch panel 10 in FIG. 1, the pressure sensing element 38 detects a pen pressure signal, so that the touch control chip acquires a pressure sensing value of the active pen 30 on the touch pane 10.

Figure 7:
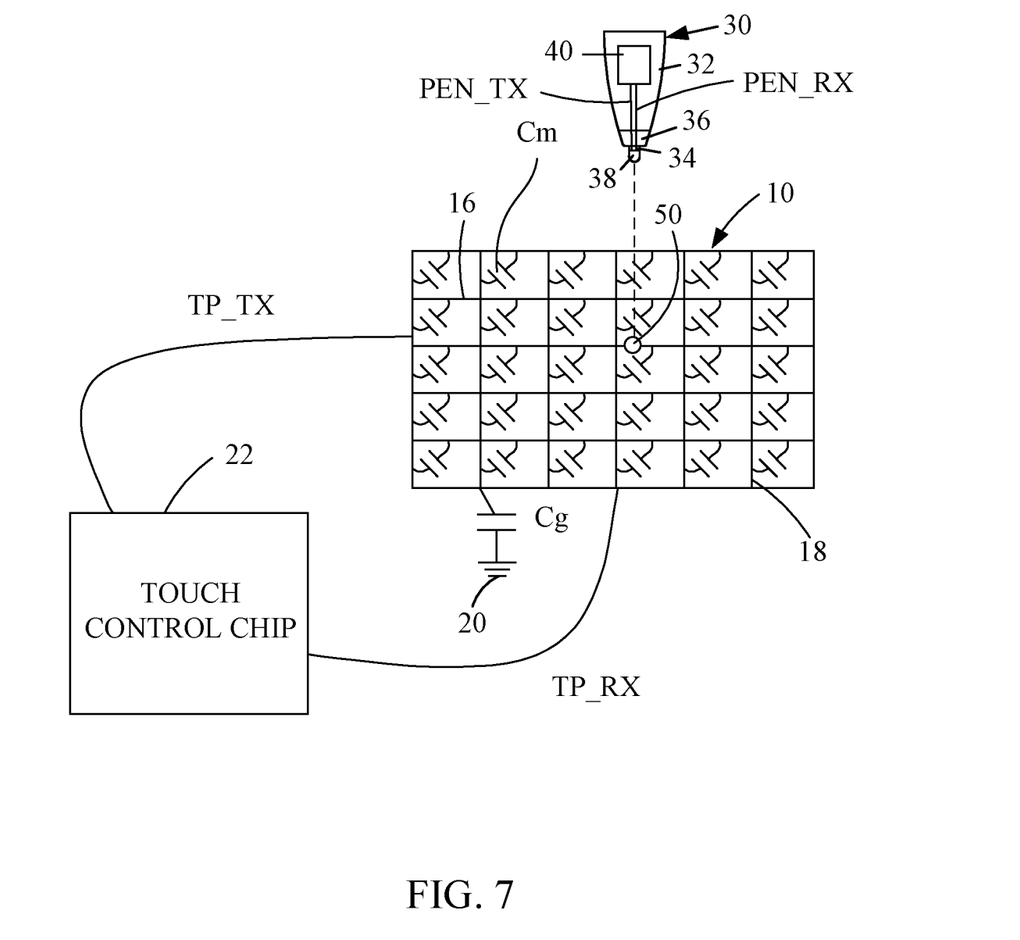
FIG. 7 illustrates a capacitive touch system in accordance with an embodiment of the present disclosure.
Figure 8:
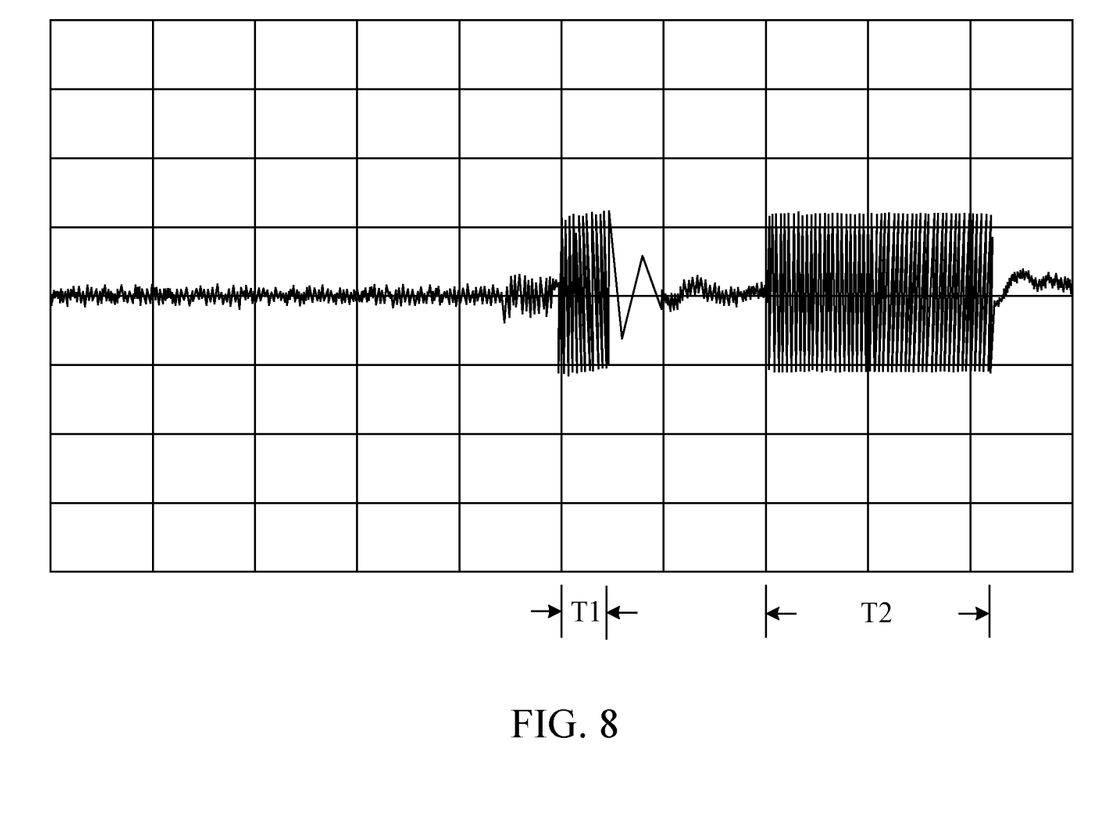
FIG. 8 illustrates a waveform diagram when the capacitive touch system detects a position of a touch and a pen pressure signal in accordance with an embodiment of the present disclosure.

Please refer to FIG. 1 to FIG. 8. FIG. 7 illustrates a capacitive touch system in accordance with an embodiment of the present disclosure. FIG. 8 illustrates a waveform diagram when the capacitive touch system detects a position of a touch 50 and a pen pressure signal in accordance with an embodiment of the present disclosure.

The capacitive touch system includes the touch panel 10, the touch control chip 22, and the active pen 30.

In a position detecting mode, the touch control chip 22 is electrically coupled to the touch panel and configured to output the panel driving signal TP_TX to the touch panel 10 periodically. The receiving part 34 of the active pen 30 is configured to sense the panel driving signal TP_TX and generate a pen sensing signal PEN_RX. A control unit 40 of the active pen 30 is configured to control the transmitting part 36 to output a pen driving signal PEN_TX (i.e., a signal in a time period T1 in FIG. 8) according to an amplitude of the pen sensing signal PEN_RX. The pen driving signal PEN_TX is transmitted to the sensing electrode 14 in FIG. 2 via the pressure sensing element 38, thereby changing the coupling capacitance Cm between the driving electrode 12 and the sensing electrode 14 for the touch control chip 22 to detect the position (i.e., coordinate) of the touch 50 of the active pen 30.

For example, the pen driving signal PEN_TX is directly proportional to the pen sensing signal PEN_RX. That is, when the pen sensing signal PEN_RX is larger, the pen driving signal PEN_TX is larger. This is to simulate a touch by a finger, so that a voltage change is approximate to a Gaussian curve. As such, the coordinate of the touch 50 can be calculated conveniently.

After the position detecting mode, the active pen 30 is switched to a pressure sensing mode. When the pressure sensing element 38 generates the touch 50 on the touch panel 10, the pressure sensing element 38 detects a pen pressure signal and transmits the pen pressure signal to the control unit 40 of the active pen 30. The control unit 40 outputs, in response to the pen pressure signal, a voltage signal (i.e., a signal in a time period T2 in FIG. 8) after a time delay period (passes). The voltage signal is transmitted to the touch control chip 22 via the transmitting part 36 and the touch panel 10. The time delay period is not limited and can be adjusted or designed according to a driving frequency of the panel driving signal TP_TX.

In the prior art, an active pen has to be linked to and paired with a touch panel, so that a pressure sensing value can be transmitted. A feature of the capacitive touch system of the present disclosure is that the voltage signal is transmitted via the pressure sensing element 38. Therefore, the active pen 30 is not required to be linked to and paired with the touch panel 10. Furthermore, the time delay period can be appropriately designed according to the driving frequency of the panel driving signal TP_TX. Accordingly, transmitting the pen driving signal PEN_TX in the position detecting mode is not affected. That is, in the position detecting mode, the active pen 30 can transmit the pen driving signal PEN_TX (configured to detect the position of the touch) synchronously without the time delay period. In the pressure detecting mode, the active pen 30 transmits the voltage signal (configured to detect the pressure sensing value) asynchronously due to the time delay period.

In detail, after the pen pressure signal is transmitted to the control unit 40, the control unit 40 performs an analog-to-digital conversion to the pen pressure signal and then outputs the voltage signal according to a converted value (i.e., representing an amplitude of the pen pressure signal) of the pen pressure signal. The voltage signal may be a square wave or any other wave, for example, a triangular wave or a sawtooth wave.

In one embodiment, a time duration for which the control unit 40 outputs the voltage signal is directly proportional to the amplitude of the pen pressure signal. That is, when the pen pressure signal is larger, the time duration of the voltage signal is longer.

In one embodiment, a frequency of the voltage signal is the same as the frequency of the panel driving signal TP_TX. In another embodiment, the frequency of the voltage signal may be different from the frequency of the panel driving signal TP_TX.

Figure 9:
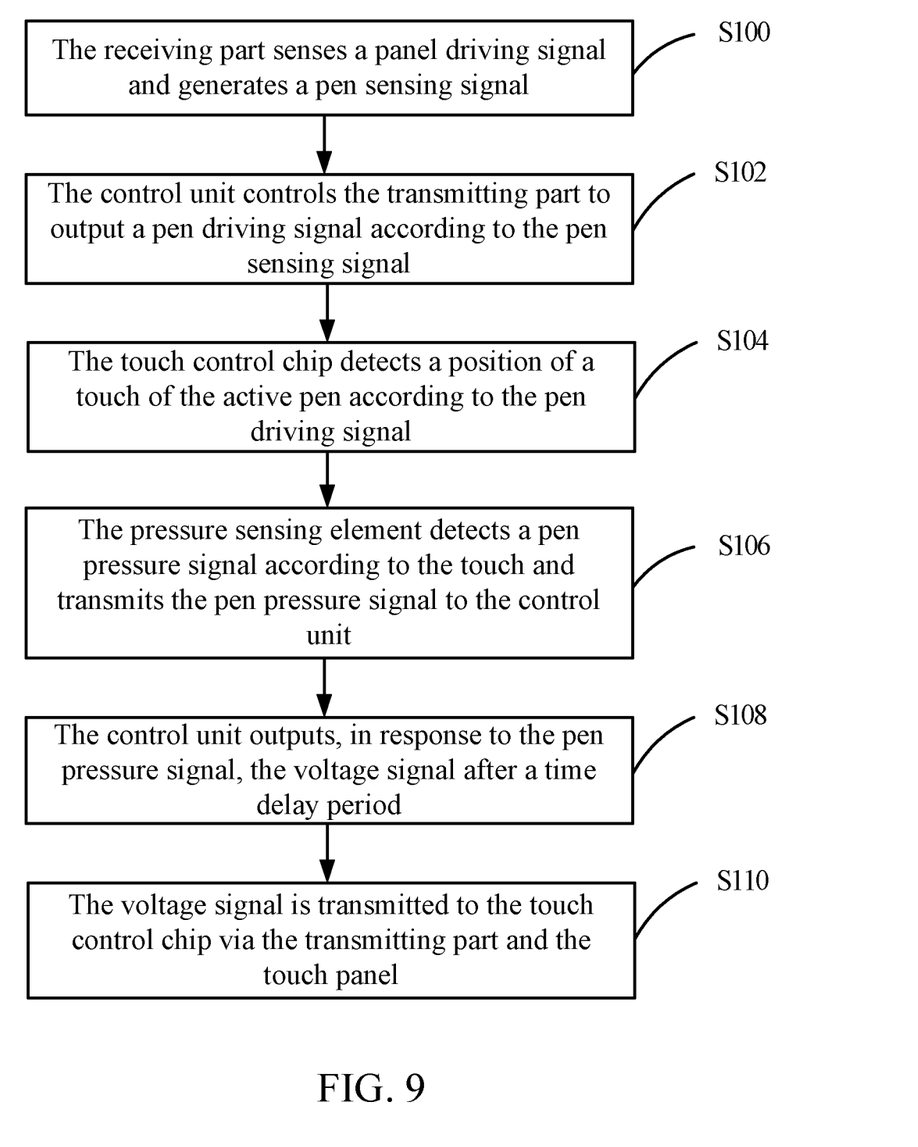
FIG. 9 illustrates a flowchart of a sensing method of a capacitive touch system in accordance with an embodiment of the present disclosure.

Please refer to FIG. 9. FIG. 9 illustrates a flowchart of a sensing method of a capacitive touch system in accordance with an embodiment of the present disclosure.

The capacitive touch system includes a touch panel, a touch control chip, and an active pen. The active pen includes a receiving part, a transmitting part, a control unit, and a pressure sensing element. The sensing method of the capacitive touch system includes the following operations.

In block S100, the receiving part senses a panel driving signal and generates a pen sensing signal.

In block S102, the control unit controls the transmitting part to output a pen driving signal according to the pen sensing signal. The pen driving signal is directly proportional to the pen sensing signal.

In block S104, the touch control chip detects a position of a touch of the active pen according to the pen driving signal.

In block S106, the pressure sensing element detects a pen pressure signal according to the touch and transmits the pen pressure signal to the control unit. In detail, after the pen pressure signal is transmitted to the control unit, the control unit performs an analog-to-digital conversion to the pen pressure signal and then outputs a voltage signal according to a converted value of the pen pressure signal.

In block S108, the control unit outputs, in response to the pen pressure signal, the voltage signal after a time delay period (passes). The time delay period can be adjusted according to a driving frequency of the panel driving signal. A frequency of the voltage signal may be the same as or different from the frequency of the panel driving signal.

In block S110, the voltage signal is transmitted to the touch control chip via the transmitting part and the touch panel.

In the capacitive touch system and the sensing method thereof, the active pen is not required to be linked to and paired with the touch panel. Furthermore, the active pen can transmit the pen driving signal (configured to detect the position of the touch) synchronously without the time delay period and transmit the voltage signal (configured to detect the pressure sensing value) asynchronously due to the time delay period.

While the preferred embodiments of the present disclosure have been illustrated and described in detail, various modifications and alterations can be made by persons skilled in this art. The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

What is claimed is:

1. A capacitive touch system, comprising:
   a touch panel;
   a touch control chip configured to output a panel driving signal to the touch panel periodically; and
   an active pen comprising a receiving part, a transmitting part, a control unit, and a pressure sensing element,
   wherein in a position detecting mode, the receiving part senses the panel driving signal and generates a pen sensing signal, the control unit controls the transmitting part to synchronously output a pen driving signal according to the pen sensing signal, the touch control chip detects a position of a touch of the active pen according to the pen driving signal, and the position of the touch is acquired according to the pen driving signal,
   in a pressure detecting mode, the pressure sensing element detects a pen pressure signal according to the touch and transmits the pen pressure signal to the control unit, the control unit outputs, in response to the pen pressure signal, a voltage signal after a time delay period, the voltage signal is asynchronously transmitted to the touch control chip via the transmitting part and the touch panel, and a pressure sensing value of the active pen is acquired according to the voltage signal,
   wherein a time duration for which the control unit outputs the voltage signal is directly proportional to an amplitude of the pen pressure signal.

2. The capacitive touch system according to claim 1, wherein the pen driving signal is directly proportional to the pen sensing signal.

3. The capacitive touch system according to claim 1, wherein the time delay period is adjusted according to a driving frequency of the panel driving signal.

4. The capacitive touch system according to claim 1, wherein after the pen pressure signal is transmitted to the control unit, the control unit performs an analog-to-digital conversion to the pen pressure signal and then outputs the voltage signal according to a converted value of the pen pressure signal.

5. The capacitive touch system according to claim 1, wherein a frequency of the voltage signal is same as a driving frequency of the panel driving signal.

6. A sensing method of a capacitive touch system, the capacitive touch system comprising a touch panel, a touch control chip, and an active pen, the active pen comprising a receiving part, a transmitting part, a control unit, and a pressure sensing element, the sensing method of the capacitive touch system comprising:
   sensing a panel driving signal from the touch control chip and generating a pen sensing signal by the receiving part, in a position detecting mode;
   controlling the transmitting part to synchronously output a pen driving signal according to the pen sensing signal by the control unit in the position detecting mode;
   detecting a position of a touch of the active pen according to the pen driving signal by the touch control chip, and acquiring the position of the touch according to the pen driving signal in the position detecting mode;
   detecting a pen pressure signal according to the touch and transmitting the pen pressure signal to the control unit by the pressure sensing element in a pressure detecting mode;
   outputting, in response to the pen pressure signal, a voltage signal by the control unit after a time delay period in the pressure detecting mode; and
   transmitting asynchronously the voltage signal to the touch control chip via the transmitting part and the touch panel, and acquiring a pressure sensing value of the active pen according to the voltage signal in the pressure detecting mode,
   wherein a time duration for which the control unit outputs the voltage signal is directly proportional to an amplitude of the pen pressure signal.

7. The sensing method of the capacitive touch system according to claim 6, wherein the pen driving signal is directly proportional to the pen sensing signal.

8. The sensing method of the capacitive touch system according to claim 6, wherein the time delay period is adjusted according to a driving frequency of the panel driving signal.

9. The sensing method of the capacitive touch system according to claim 6, wherein after the pen pressure signal is transmitted to the control unit, the control unit performs an analog-to-digital conversion to the pen pressure signal and then outputs the voltage signal according to a converted value of the pen pressure signal.

10. The sensing method of the capacitive touch system according to claim 6, wherein a frequency of the voltage signal is same as a driving frequency of the panel driving signal.

* * * * *